July 28, 1970  J. S. BARRY  3,521,927
OPEN-TOPPED TRAILER COVER
Filed Feb. 28, 1968
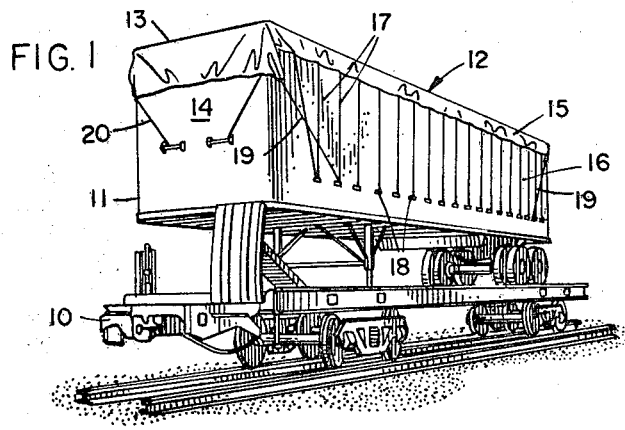
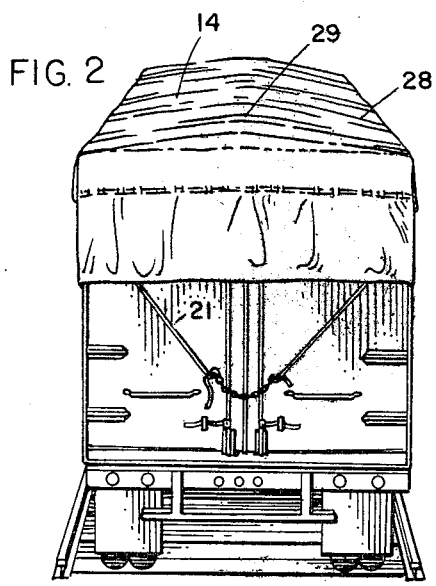
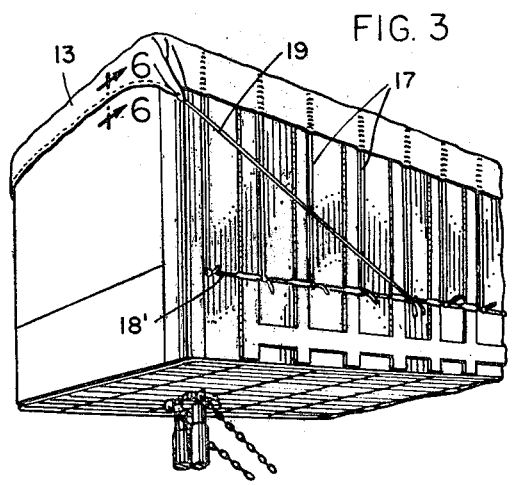
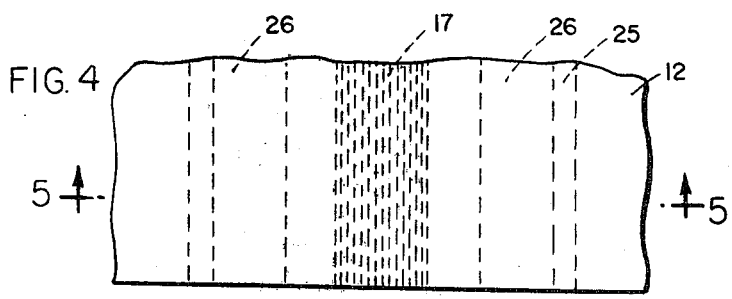
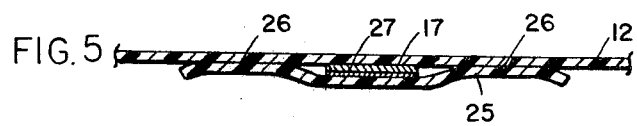
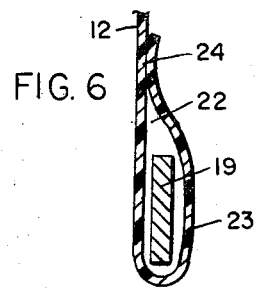
INVENTOR:
JAMES S. BARRY
BY
Dawson, Tilton, Falloy & Lungmus
ATT'YS

United States Patent Office 3,521,927
Patented July 28, 1970

3,521,927
OPEN-TOPPED TRAILER COVER
James S. Barry, Omaha, Nebr., assignor of one-half interest each to International Paper Company, New York, N.Y., a corporation of New York, and The Stanley Works, New Britain, Conn., a corporation of Connecticut
Filed Feb. 28, 1968, Ser. No. 708,940
Int. Cl. B60p 7/04
U.S. Cl. 296—100                      3 Claims

ABSTRACT OF THE DISCLOSURE

A flexible polyethylene cover of lightweight construction (approximately 10–25 mils thick) for an open-topped piggyback trailer (approximately 40 feet long x 8 feet wide) wherein the cover has draped portions along the four sides, the cover being supported by straps running transversely of the trailer and extending beyond the cover for tie-down connection on the vertical side. The straps are connected to the cover by means of polyethylene strips, each strip sealed along its side to the cover and confining a given strap, each strap being bonded to its associated strip, the area of heat sealing in the draped portion being, for each strap, at least about 5 square inches for each foot of strap in the draped portion.

BACKGROUND OF INVENTION

For years open-topped trailers have been temporarily covered with tarpaulins (of canvas construction). These have been secured in place by tie-down ropes extending from eyelets or patches on the four draped sides. It was felt that these coverings had to be quite strong in order to satisfactorily resist two commonly encountered stresses. The stress tending to push the cover into the trailer resulted from rain and snow loads. The stress tending to lift the cover off the trailer resulted from high winds. Thus, the practice in the trade tended toward relatively heavy, permanent-type covers. These were, to a degree, flexible so that they could be unrolled for installation and thereafter rerolled for unloading of the trailer contents. Because of the durable nature, these coverings were intended to be reused. For example, a conventional covering today may cost $125.00. It will be appreciated that these coverings would not be economical if, after the first use, the cover were found to be soiled or ripped so as to make it unsuitable for further use.

The thing desired in a situation like this was a disposable cover. Further, the cover, to be disposable, must be sufficiently inexpensive so as to justify discarding after a single use. This meant not only cheap but a small quantity of the covering material, i.e., one that is relatively lightweight by virtue of being extremely thin. However, this worked at cross purposes to the strength necessary to withstand the above-mentioned loadings. For example, to fabricate a disposable cover in a justifiable price range, i.e., about $25.00, it was necessary to go to relatively thin plastic material such as polyethylene in the range of 10–25 mils thickness. When constructed according to the prior teachings relative to the tie-down connections, the plastic cover failed under normal loadings.

SUMMARY OF INVENTION

I have found that the problem of providing a plastic cover, lightweight enough to be disposable after a single use, yet strong enough to sustain normally encountered rain, snow, and wind loads, can be solved through a unique manner of coupling the tie-down members, i.e., straps, ropes, cords, etc., to the relatively extensive plastic cover. Further, I have found that the area of critical connections, even where the tie-down means extend the full width of the cover, is in the cover-edge portion which is draped down the vertical sides of the trailer or other vehicle. More specifically, I have discovered that there must be a minimum strength and configuration in the union which is subject to shear stress.

DETAILED DESCRIPTION OF INVENTION

The invention is described in conjunction with an illustrative embodiment in the accompanying drawings, in which FIG. 1 is a perspective view of a "piggyback" trailer mounted on a flatcar, with the open top of the trailer being closed by a cover constructed and connected according to the invention;

FIG. 2 is a perspective view (taken from the rear of the trailer) showing the inventive cover coupled to a slightly different form of trailer;

FIG. 3 is a fragmentary-perspective view of the front and left side of the trailer of FIG. 2 and showing the inventive cover installed thereon;

FIG. 4 is a fragmentary top-plan view of the encircled portion designated 4 in FIG. 2;

FIG. 5 is a fragmentary-sectional view taken along the sight line 5—5 applied to FIG. 4; and FIG. 6 is a fragmentary-sectional view taken along the sight line 6—6 applied to FIG. 3.

In the illustration given, and with particular reference to FIG. 1, the numeral 10 designates a railway flatcar which is transporting in conventional fashion a piggyback trailer 11. The numeral 12 designates generally the inventive cover which is seen to close the top (not shown) of the trailer 11 and which provides a draped portion 13 at the "front" vertical wall 14 of the trailer 11 and a draped portion 15 along a vertical sidewall 16. It will be appreciated that the cover is draped on all four sides of the trailer. Extending downwardly from the draped portion 15 are a plurality of tie members 17 which are secured to brackets 18 provided along the side 16.

The showings in FIGS. 2 and 3 are essentially similar except for the type of trailer. The trailer of FIGS. 2 and 3 has a tie-down rod 18' to which the tie-down members 17 are secured.

In FIGS. 1 and 3, there is a front end tie-down 19 which holds down the front drape 13, the front end tie-down 19 being angled downwardly and readwardly for connection with the tie-down securing means, 18 or 18' as the case may be. To achieve neat corners in the installed cover, the next-to-the-last tie-down may be angled downwardly and inwardly on the end walls as at 20 relative to the showing of FIG. 1 and 21 relative to the showing in FIG. 2.

A section of a typical cross-tie 17 is seen in FIG. 5. It will be appreciated that the cross-tie members (straps—as shown) not only extend completely transversely of the cover 12 but extend therebeyond a discreet distance so as to provide suitable lengths for tie-down. In the embodiment illustrated, the cover 12 is constructed of commercially available black polyethylene having a minimum thickness of 0.012 inch (12 mils). Normally the film constituting the cover 12 will vary slightly in thickness over its eleven foot width, one suitable embodiment measuring 0.013"±.0002". For the typical piggyback trailer 11, the length is forty-four feet long and for tying this down, I employ twenty tie-down straps 17, each twenty-three feet long and constructed of one-half inch wide rayon strapping. The strapping in the illustration given is constructed of a number of elongated fibers arranged in side-by-side relation and laminated together to form a strap quite resistant to transverse shear. The end straps as at 19 in FIG. 3 (also seen in FIG. 6) are confined within a pocket 22 developed by folding under a portion 23 of the cover 12 and heat sealing, i.e., fusingly integrating portions together as at 24. In the illustration given, the end straps 19 are each thirty-one feet long and also are constructed of one-half inch wide rayon strapping having a minimum tensile strength of five hundred pounds. The tensile strength of the sheet making up the cover 12 is 1125 p.s.i. Tear propagation in the sheet amounts to 8.0 pounds according to ASTM–D–1938–62t.

To connect the transverse, intermediate straps 17 to the cover 12, I employ polyethylene strips as illustrated at 25 in FIGS. 4 and 5. In the illustration given, the polyethylene strips are of light material similar to that making up the cover 12 and have lengths co-extensive with the width of the cover sheet 12, i.e., eleven feet. The widths of the strips 25 (i.e., the dimension measured lengthwise of the cover 12) is two and one-half inches. Intermediate the longitudinal edges of each strip 25 and spaced from the associated strap 17 are a pair of linear heat seals as at 26. Additionally, each strap 17 is bonded to its associated strip by means of adhesive or light material as at 27. Thus, there is no direct connection between the strap 17 and the cover 12 but by virtue of the intermediary means of the bonding medium 27 and the strip 25, the straps 17 are, in effect, integrated with the cover 12. The tear strength across the heat seal 26 is of the order of 7.5 pounds for a one inch wide sample.

In one means of developing the inventive construction, a transfer tape having both sides equipped with adhesive is employed as the bonding medium 27. This is initially applied to the strapping 17 after which the film strip 25 is applied to the other side of the transfer tape constituting the bonding material 27. Excellent results are obtained where the transfer tape 27 is used to secure the strap 27 to the strip 25 is no wider than the strap itself so that there is no possibility of interference with the heat seals 26 to be developed beween the strip 25 and the cover 12. Optimally, the strip 25 should project laterally from the tape 17 three-quarters of an inch to one inch so that sufficient surface is exposed to the heat-sealing unit. The heat-sealing unit, advantageously of the bar type, is equipped with a double head capable of sealing both sides of the strips simultaneously.

I have also found that the heat sealing, particularly at the terminal portions of the strip 25, is critical for the successful operation of the cover 12. Where a heat seal is inadequate or imperfect, there is a tendency to delaminate which thereupon permits relative movement between the sheet constituing the cover 12 and the strap 17. As relative movement progresses, depressions form between adjacent straps as would be found in the area designated 28 in FIG. 2. This occurs notwithstanding the provision of a longitudinal-center brace 29 (like a ridge pole) ordinarily provided in the trailer. With a depression 28 formed, there is provided a pocket or receptacle which allows the buildup of rain or snow to the point where excessive stress is applied to the cover resulting in premature failure. By the same token, the development of a recess or depression (by virtue of "creeping") of the cover film 12 relative to the strapping 17 makes possible a flapping or untaut portion so that excessive wind velocity can result in premature failure of the cover. In the covers tested and which did fail, the common fault lay in the creeping upwardly of the draped portion 15 due to inadequate securement of the draped portion to the downward run of the strapping 17. Thus, it is important in the downwardly extending draped portion 15 that there be a sturdy union between the cover 12 and the strapping 17. In the failures noted, the heat seals 26 have been imperfect or inadequate. Where, for example, the aggregate area heat seals per strap (i.e., on each side thereof) is less than five square inches for each lineal foot of strapping in the draped portion 15, premature failure is likely to occur. Pursuant to this, optimum results are achieved where I employ heat seals that are three-eighths inch wide, i.e., a total of nine square inches for each lineal foot of strip 25. Also, it is important that the heat seals be generally linear. Where the fabrication is imperfect and the heat seal 26 is skewed so as to develop a portion overlapping the strap 17, premature failure has resulted. Still further, where the heat seal is not a complete union initially so as to develop a fused integration of the strip 25 with the cover sheet 12, a failure results. In certain instances, the heat seal operation has been performed twice in the same region so as to achieve a semblance of this integration and in such instances where double heating has occurred along the draped portions, premature failures, i.e., overloading under normal operating conditions, has resulted.

The data in the table below indicates the strap-sheet bond and how the same varies with length.

| Length of sample at — | Force to achieve shear, lbs. | Unit force, lbs./sq. in |
|---|---|---|
| 2 in | 12 | 12 |
| 4 in | 19 | 9 |
| 10 in | 30 | 6 |
| 12 in | 34 | 5.66 |

This data reflects that the adhesive binder has a maximum strength and underpulls the bond peels rather than shears, thus giving lower results.

For proper support, I have found that the spacing between tie-down members, i.e., the straps 17, should be in the range of about two feet to about four feet. Spacings less than this range are not only uneconomical but tend to weaken the cover—the spacings above four feet providing inadequate coupling of the cover to the trailer for normal stress loadings.

Other procedures may be employed for bonding the strapping (or cord, rope, etc.) 17 to the strip 25. Precoating of the tie-down means 17 by extrusion coating or dip coating is effective, particularly since the union between the tie-down means 17 and the strip 25 is not subjected to substantial shearing stress. The principal stress is applied to the unions 26. This is true irrespective of whether the cover is installed with the strapping 17 underneath (as illustrated) or topside. For most installations, I prefer to install the cover with the cross-tie means 17 below the cover 12—this presenting a somewhat smoother top surface, although, in testing, no noticeable difference has been observed because of the position of the cross-tie means.

In certain instances, particularly with smaller vehicles, the covering sheet in addition to being made smaller, may also be constructed by laminating the straps directly to the sheet itself. Through the use of a suitable adhesive, the confining strips 25 may be eliminated, bonding the straps 17 directly to the main body of the sheet. However, this is preferred only for the small unit.

While in the foregoing specification a detailed description of an embodiment of the invention has been set down for the purpose of illustration, many variations of the details herein given may be made by those skilled in the art without departing from the spirit and scope of the invention.

I claim:

1. In combination with an elongated generally rectangular open-topped vehicle having tie-down means on the vertical sides thereof for securing tie members extending outwardly of a flexible cover closing said open top, the improved cover characterized by the fact that it includes:

an elongated flexible thermoplastic sheet of a thickness in the range of 0.010–0.025 inch dimensioned so as to overlap said generally rectangular open top to provide draped portions along said vertical sides, a plurality of flexible members extending transversely of the length of said sheet and extending beyond the sheet width, said members being anchored to said tie-down means on said vertical sides to support said sheet, said members being spaced apart longitudinally of said sheet by a distance in the range of about two feet to about four feet, a transversely elongated support strip of flexible thermoplastic material bonded to each of the members which are intermediate the sheet ends, each strip extending along the member length coextensive with the width of said sheet, the said strips each being dimensioned to overlap its associated members on each side to present an area in confronting, face-to-face relation with said sheet for heat-sealing union therewith, said sheet and strips having a lineal area of fused integration across the sheet width on each side of each of said intermediate members, the area of integration between each strip and the sheet for each member being at least about five square inches for each foot of member length in said draped portion.

2. The structure of claim 1 in which said members are positioned under said sheet.

3. The structure of claim 1 in which the members associated with each sheet end are slidingly confined within pockets developed by folding said sheet on itself, each folded portion having a lineal area of fused integration with said sheet to provide one of said pockets.

References Cited

UNITED STATES PATENTS

| | | | |
|---|---|---|---|
| 2,807,499 | 9/1957 | Duddleston | 296—100 |
| 3,024,063 | 3/1962 | Robinson | 296—100 |
| 3,256,837 | 6/1966 | Blatt | 160—368 X |

BENJAMIN HERSH, Primary Examiner

L. J. PAPERNER, Assistant Examiner

U.S. Cl. X.R.

160—368